Nov. 14, 1944.  A. DUKE  2,362,747
IRRIGATION SYSTEM
Filed Oct. 30, 1942  2 Sheets-Sheet 2

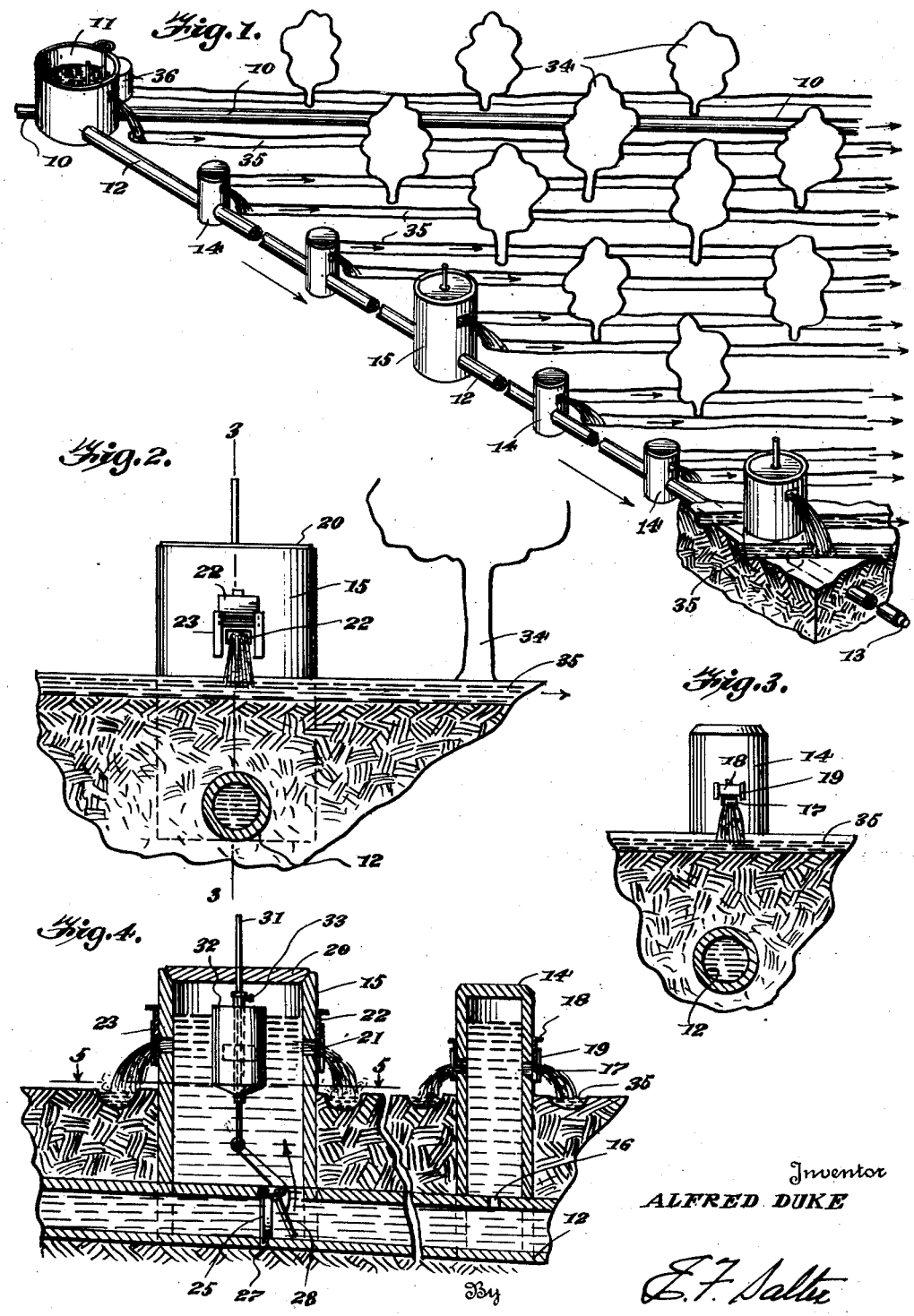

Inventor
ALFRED DUKE
By E. F. Salter
Attorney

Patented Nov. 14, 1944

2,362,747

UNITED STATES PATENT OFFICE 2,362,747

IRRIGATION SYSTEM

Alfred Duke, Colton, Calif.

Application October 30, 1942, Serial No. 463,983

7 Claims. (Cl. 61—12)

The present invention relates to the art of irrigating land and more particularly to a system for irrigation.

An important object of the present invention is to provide a system for irrigation which will operate at low pressure so as to irrigate the land without washing out the soil.

Another object of the invention is the provision of a system of this kind in which the flow of water may be regulated without changing the setting or regulation of the floats in the floatstands.

A further object of the invention is to provide a system of this character which may be installed and operated at low cost, and which is of simple construction and operation.

Other objects and advantages of the invention will become apparent during the course of the following description.

In the accompanying drawings, which form a part of this specification and wherein like characters of reference denote like parts throughout the same, Figure 1 is a perspective view illustrating a portion of an irrigation system embodying the present invention, the system being shown diagrammatically;

Figure 2 is an elevation of one of the floatstands showing the pipe line in cross section;

Figure 3 is a similar view of one of the capstands;

Figure 4 is a sectional view on the line 3—3 of Figure 2 and taken longitudinally of the pipe line through one of the floatstands and one of the capstands, parts being broken away;

Figure 5:
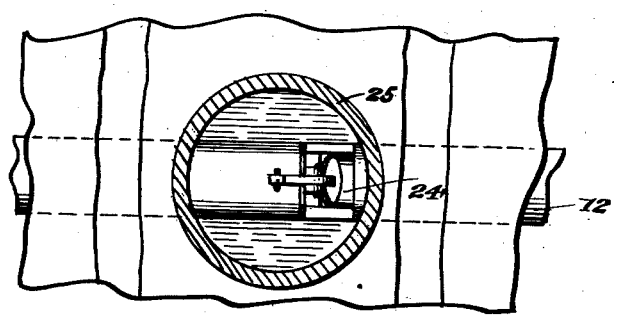
Figure 5 is a horizontal sectional view taken on the line 5—5 of Figure 4.

In the drawings, wherein for the purpose of illustration is shown a preferred embodiment of the invention, the numeral 10 designates a main water supply line connected to a water box 11. A pipe line 12 is connected to the lower portion of the water box 11 and flows downhill away from the box 11, as illustrated in Figure 1. At its lower end, the pipe 12 is closed by a plug 13. A series of capstands 14 are spaced along the pipe 12 and floatstands 15 are disposed between some of the capstands. The capstands will outnumber the floatstands. In practice, starting from the lower plugged end of pipe line 12, there will be a group of capstands spaced along the pipe 12 and communicating therewith, then a floatstand, then another group of capstands, another floatstand, etc. until the water box is reached, as indicated more or less diagrammaticaly in Figure 1, the water box itself comprising in effect the first floatstand since its feed to the pipe 12 is float controlled in substantially the same manner as subsequently described for the floatstands 15.

The pipe line 12 may be buried beneath the surface of the ground. The capstands 14 are identical in construction and each comprises a cylindrical or other shape hollow body extending vertically from the pipe line 12 to a point above the ground. The capstands are closed at their tops and communicate with the interior of the pipe 12 by openings 16. Each capstand is provided between its top and the surface of the ground with openings 17 disposed diametrically and shown as two in number. The openings 17 may be partially or completely closed by means of vertically movable gates 18 which slide in vertical guides 19 secured to the exterior of the capstand at each side of the orifice 17. The gates 18 have a snug fit in the grooves of guides 19 so that they will be frictionally held in their adjusted position.

Figure 6:
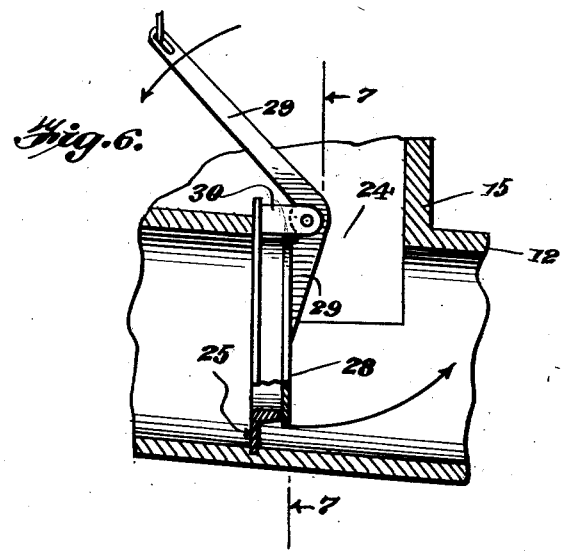
Figure 6 is a vertical fragmentary section through the pipe line at the float valve mechanism, portions of the valve mechanism being shown in section.
Figure 7:
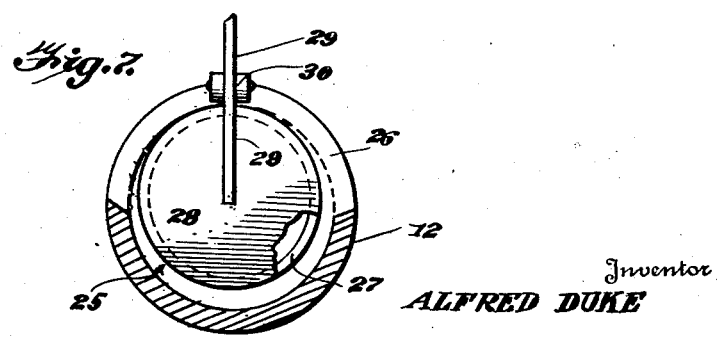
Figure 7 is a vertical sectional view on the line 7—7 of Figure 6.

Each floatstand 15 comprises a large casing, preferably cylindrical in shape, which extends from pipe 12 to a point spaced a substantial distance above the surface of the ground. The top of the casing is closed by a removable cover 20. Openings 21 are provided with gates 22 sliding in guides 23 in the same manner as gates 18 of the capstands. The top of pipe 12 is cut away to provide an opening 24 communicating with the interior of the casing of floatstand 15 adjacent the lower or downside of the casing, as seen in Figures 4, 5 and 6. A valve seat ring 25 extends completely across the pipe 12 at the high side of opening 24. The ring 25 has a flange 26 which engages the wall of opening 24 and its lower edge may be secured to the pipe in any suitable manner, as by engagement in a groove in the interior of the pipe or by means of cement. An annular valve seat 27 extends horizontally from the ring 25 towards the downhill end of pipe 12 and is disposed eccentrically of the pipe 12 and ring 25 so as to extend from the top of the pipe to a point spaced from the bottom of the pipe. A valve disk 28 is adapted to seat upon the annular seat 27 and is provided with an upwardly extending lever 29 in the form of a bell crank which is journaled adjacent its angular portion between a pair of horizontal arms 30 carried by the top of the ring 25. The upper portion of lever 29 extends upwardly and at an angle towards the axis of casing 15 where it is pivotally connected to a vertical rod 31 slidably received in an opening in cover 20 and disposed axially of the casing 15. A large, cylindrical float 32 is slidably mounted on rod 31 and is provided with a set screw 33 to secure the float to the rod at the desired position thereon. It will be seen that as water rises in the casing 15, the float will rise and close valve 28 to block the pipe 12. When the water level falls in casing 15, the float will drop and open valve 28. The valve 28 is only slightly smaller than the internal diameter of pipe 12, but due to its eccentric position it may move freely about its journals without binding in the pipe.

Rows of trees, bushes or plants 34 are illustrated in Figure 1, and suitable furrows or trenches 35 extend along each side of the rows 34 to irrigate the trees or the like.

The openings and gates in the capstands, floatstands and water box pass streams of water to the furrows 35, as illustrated in Figures 1, 2, 3 and 4. When water from main 10 enters water box 11 it passes down pipe 12 to its end and then backs up pipe 12 to fill the lowest capstand, then the next lowest capstand, and so on until it reaches and fills the first floatstand. As the floatstand is filled, the float closes the valve and shuts off the pipe from the pressure of water above the floatstand. The water then backs up from the valve to fill the capstands and floatstands up the pipe line 12. The floatstands 15 divide the pipe 12 and capstands into sections or groups, and as the valves 28 are closed, each section is separated from the other sections. It will thus be seen that the sections are only subjected to the pressure of water in that section and not to the pressure or head of water in the whole pipe line or system. Consequently, each section will operate on low pressure and the water passing through openings 17 and 21 will not wash out the soil but will pass down the furrows in the desired manner. Water backing up to the water box 11 is returned to the main 10 by means of overflow 36 to pass on to the next pipe line in the system.

Due to the division of the pipe line by the float valves, the water will flow along the furrows to their ends to irrigate evenly without washing out the soil adjacent pipe line 12 and without overflowing from the furrows as would be the case where a large head of water acted upon the gates and openings in the stands. The amount of water leaving the stands is regulated by the adjustable gates 18 and 22 without changing the float adjustment or operating other valves. The desired pressure or head is obtained by proper spacing of the floatstands and the fall therebetween and a head of from six to eight feet has been found to be very effective in practice. In addition to maintaining a low pressure on the gates, the present system will be free from surging due to the absence of air in the system. This result is believed to be due to the fact that the system is filled by backing the water from the low point to the high points and to the fact that the line 12 is completely filled during irrigating.

In prior systems, adjustment of the outlet gates had to be accompanied by adjustment of valves or the like to vary the flow of water to the stands and gates. With the present system, only the gates need be adjusted, the floats taking care of the supply of water. In practice, it is found that the movement of the floats 32 is very slow, being almost imperceptible to the eye.

The present system is of simple construction, easily installed and inexpensive to manufacture and install, and consequently can be used even on small ranches, farms or orchards where the usual type of equipment is too complicated and expensive for practical use.

Having thus described my invention, what is claimed is:

1. In an irrigating system, a pipe line, a series of irrigating stands spaced along said pipe line and communicating therewith, and float controlled valves disposed at spaced intervals along said pipe line to regulate the flow into certain of said stands in response to the respective water levels within said stands and adapted in their closed positions to completely block said pipe line and divide it into a series of separated sections in which water flowing from the irrigating stands is under the pressure of the head of water in its section of the pipe line and independent of the pressure of the head of water in other sections of the pipe line.

2. In an irrigating system, a pipe line, a series of irrigating stands spaced along said pipe line and communicating therewith, and float controlled valves disposed at spaced intervals along said pipe line and adapted in their closed positions to completely block said pipe line and divide it into a series of separated sections in which water flowing from the irrigating stands is under the pressure of the head of water in its section of the pipe line and independent of the pressure of the head of water in other sections of the pipe line, the float of each of said valves being disposed in one of the stands and controlled by the level of water in such stand.

3. In an irrigating system, an inclined pipe line closed at its lower end, a series of irrigating stands spaced along said pipe line and communicating therewith, and means to pass water into the high end of the pipe directly through the pipe to its closed lower end to be backed up through the pipe line to fill the stands in succession starting with the stand adjacent the closed lower end of the pipe and working up the pipe to its high end, valve means disposed in series at spaced intervals along said pipe line to divide said pipe line into separate sections to reduce the head of water in each section, and means responsive to the water levels in certain of said stands to operate said valve means individually, said irrigating stands having water outlet openings controlled by adjustable gates, said valve means operating for all adjustments of the gates.

4. In an irrigating system, an inclined pipe line closed at its lower end, a series of irrigating stands spaced along said pipe line and communicating therewith, and means to pass water into the high end of the pipe directly through the pipe to its closed lower end to be backed up through the pipe line to fill the stands in succession starting with the stand adjacent the closed lower end of the pipe and working up the pipe to its high end, and valve means disposed at spaced intervals along said pipe line to divide said pipe line into separate sections to reduce the head of water in each section, said valve means each being opened and closed by a movable float disposed in one of the stands, said float being adjustable, said stands having water outlet openings controlled by adjustable gates, said float being operable at a given adjustment for all possible adjustments of the outlet gates.

5. In an irrigation system, a pipe line having a plurality of spaced distributing stands connected thereto in series, a source of water supply connected to one end of said pipe line, and a set of automatic controls responsive to liquid levels in certain of said stands to regulate the flow of water into said certain stands and to divide the entire series of stands into separately controlled groups.

6. In an irrigation system, a pipe line connected at one end to a source of water supply, a plurality of groups of stands connected into said line in series, each group comprising a relatively large stand and several smaller stands to be controlled thereby, said smaller stands having water distribution outlets, and each of said large stands having a level-responsive valve disposed across the line in advance of the inlet to the stand for regulating its intake from said line and thereby controlling the water head imposed upon its associated smaller stands.

7. In the combination of claim 6, said large stands also having water distribution outlets, and all of the outlets of all of said stands having means for controlling the rates of flow therethrough.

ALFRED DUKE.